June 28, 1955  R. T. COOK  2,711,671
COMPOSITE OPHTHALMIC MOUNTING
Filed Nov. 19, 1952

INVENTOR.
Roland T. Cook,
BY George D. Richards
Attorney

United States Patent Office 2,711,671
Patented June 28, 1955

2,711,671

COMPOSITE OPHTHALMIC MOUNTING

Roland T. Cook, Irvington, N. J., assignor to New Jersey Optical Company, Irvington, N. J., a corporation of New Jersey Application November 19, 1952, Serial No. 321,477

5 Claims. (Cl. 88—47)

This invention relates to ophthalmic mountings, and has reference, more particularly, to spectacle frames having composite lens holding rims including a cooperative form and relationship of metallic and non-metallic supporting elements.

The invention has for an object to provide a spectacle frame, the front of which includes non-metallic portions provided with novel means to furnish hinging connections for pivotally attaching temples thereto; and said means also serving, if desired, to provide the frame front with ornamenting elements.

The invention has for a further object to provide a spectacle frame including lens embracing structures each formed by a discontinuous metallic eyewire having a top section and a bottom section extending from the nasal side thereof, said sections being provided at their outer ends with separable means to releasably join said ends one with the other, which means also serves to detachably hold, within and along the top section of the eyewire, a non-metallic lens seating member which is operative with the bottom section of said eyewire for the support of a lens in the rim structure, and which means additionally serves to hold, in assembled relation therewith and with the temple end portions of said non-metallic lens seating members, means to provide a hinging connection for pivotally attaching temples to the frame; said latter means also serving as frame ornamenting elements.

Figure 1:
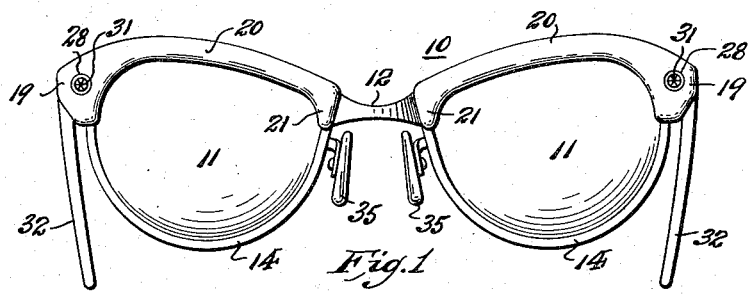

The above and other objects of this invention will be understood from a reading of the following detailed description of the invention in connection with the accompanying drawings, in which:

Fig. 1 is a front elevational view of a spectacle frame according to this invention.

Figure 2:
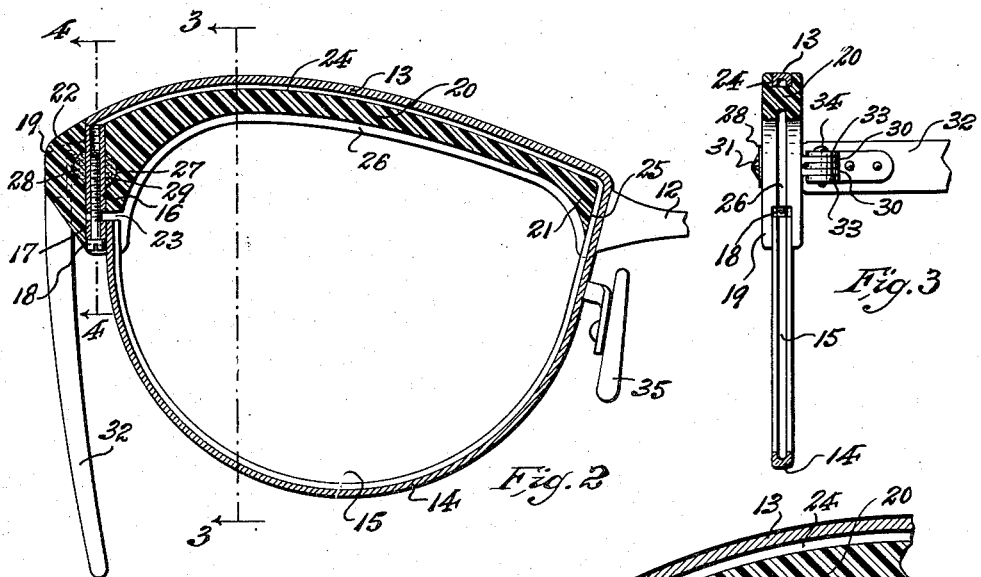
Figure 3:
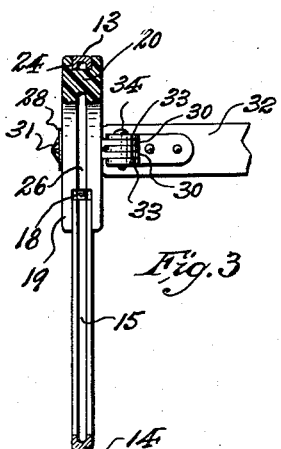
Figure 4:
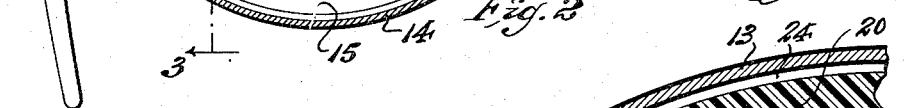
Figure 5:
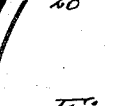

Fig. 2 is a fragmentary longitudinal vertical section through a rim structure of the spectacle frame, the same being drawn on an enlarged scale; Fig. 3 is a fragmentary vertical cross-section, taken on line 3—3 in Fig. 2; Fig. 4 is a fragmentary vertical cross-section, taken on line 4—4 in Fig. 2, and drawn on a further enlarged scale; and Fig. 5 is a horizontal sectional view, taken on line 5—5 in Fig. 4.

Figure 6:
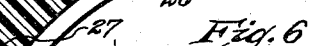
Figure 7:
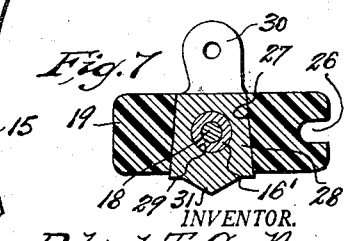

Fig. 6 is a view similar to that of Fig. 2, but showing a modified form of the means for releasably joining the ends of the eyewire sections of a rim structure and of the temple hinge connection related thereto, this view being also drawn on a further enlarged scale; and Fig. 7 is a horizontal sectional view, taken on line 7—7 in Fig. 6.

Similar characters of reference are employed in the above described views, to indicate corresponding parts.

Referring to the drawings, the reference character 10 indicates a complete spectacle frame embodying the present invention, the same including two rim structures which serve to embrace and support the spectacle lenses 11; said rim structures being connected by an intermediate nose bridge 12.

Each rim structure comprises metallic and non-metallic elements so related as to securely retain the latter in operative assembled relation to the former, whereby to cooperate in supportingly embracing a lens 11.

Each rim structure comprises a metallic eyewire element having a top section 13 from the nasal end of which extends a bottom section 14 which is integral therewith. Said bottom section is shaped to conform to the nasal, bottom and temporal edge portions of a lens 11 to be supported by the rim structure. At least the bottom section 14 of the eyewire element is provided, along its inner edge, with a groove or channel 15 to receive and embrace peripheral portions of said lens. Soldered to the temporal or outer free end of the eyewire top section 13, to form a unitary part thereof, is a substantially perpendicular, internally screw-threaded, tubular top coupler piece 16 which depends therefrom. Similarly, soldered to the outer side of the upstanding temporal or free end portion of the eyewire bottom section 14 to form a unitary part thereof, is a perpendicular tubular bottom coupler piece 17, which is adapted to be axially aligned with said top coupler piece 16 in opposition thereto. Preferably the axial bore of this bottom coupler piece 17 is not screw-threaded but smooth surfaced. Inserted upwardly through the bore of the bottom coupler piece 17 is a headed coupling screw 18, which is adapted to screw into the internally screw-threaded bore of the top coupler piece 16, whereby to couple together said coupler pieces, and thus to close the rim structure in supporting relation to an embraced lens 11, as will presently more fully appear.

The non-metallic element of the rim structure is made of plastic material, such as zylonite, a suitable artificial resinous or resinoid plastic, or the like. Said non-metallic element is shaped to provide an outer temple supporting end portion or ear 19 having, integral therewith, an inwardly extending arm 20 terminating in a nasal end portion 21. The top periphery of the ear 19 and arm 20 corresponds in shape or contour to the shape or contour of the top section 13 of the eyewire element. The periphery of the inner end of ear 19 and bottom of the arm 20 corresponds in shape or contour to the shape or contour of the upper temporal, top and upper nasal edge portions of a lens 11 to be supported by rim structure. Extending perpendicularly through the temple supporting end portion or ear 19, from top to bottom edges thereof, is an endwise open passage or bore 22. Extending laterally from the lower portion of said passage or bore 22, so as to open outwardly from both the bottom and inner end edges of the temple supporting end portion or ear 19, is a chamber 23 for the reception of the temporal end portion of the eyewire bottom section 14 and the bottom coupler piece 17 carried thereby. Leading from the top end of the passage or bore 22, in and along the top or external edge of the ear 19 and arm 20 of the non-metallic element, is an outwardly open channel 24 which joins an extension 25 thereof with which the external end edge of the nasal end portion 21 of said arm 20 is provided. Leading from the chamber 23, in and along the bottom or internal edge of the non-metallic element is a lens receiving and supporting groove or channel 26. Also extending through the temple supporting end portion or ear 19 of the non-metallic element, from the front face to the rear face thereof, is a horizontal transverse opening 27. This opening 27 intersects the perpendicular passage or bore 22 at a point intermediate the ends of the latter. Said opening 27 is substantially larger in diameter than the diameter of said passage or bore 22.

Fitted therein to extend through said opening 27 of the temple supporting end portion or ear 19 of the non-metallic element is a metallic insert 28, which is provided intermediate its ends with a diametrically extending passage 29. Said passage 29 corresponds in diameter to the diameter of the perpendicular passage or bore 22 with which it is adapted to be axially aligned, when the insert 28 is mounted in said opening 27 in operative assembled relation to the temple supporting end portion or ear 19 of the non-metallic element. Integral with the rearward end of said insert 28, to project therefrom outwardly of the rear face of said temple supporting end portion or ear 19, are one or more perforate hinge knuckle members 30. The forward end of said insert 28 is exposed at the front face of the temple supporting end portion or ear 19, and may be suitably shaped to provide an ornamental portion 31 which is adapted, by its decorative effect, to enhance the appearance of the spectacle frame.

To assemble the non-metallic element in operative relation to the eyewire element of the rim structure, the coupling screw 18 is withdrawn from the coupler piece 16, whereby to release the coupler piece 17 from coupled relation to the latter, so that the free ends of the top and bottom sections 13 and 14 of the eyewire element can be separated and spread apart; such separation and spreading being permitted by reason of the springy character of the eyewire element. After such separation, the non-metallic element is passed through the gap between the spread apart ends of the eyewire element, so as to be positioned beneath and in alignment with the top section 13 of the latter, and so as to oppose the passage or bore 22 of the temple supporting end portion or ear 19 in alignment with the coupler piece 16 of said eyewire top section 13. The non-metallic element is thereupon moved into engagement with said eyewire top section 13, so that the latter seats in the channel 24 of the former, with the extension 25 of said channel receiving the opposed upper nasal part of the eyewire bottom section 14, and also so that the top coupler piece 16 of the eyewire element is entered downwardly into the upper portion of the passage or bore 22 of the non-metallic element, and at the same time through the diametric passage 29 of the insert 28 which is mounted in and through said temporal end portion or ear 19. When the non-metallic element is thus disposed, the nasal end portion 21 thereof is lodged within and embraced by the angular juncture of the top section 13 and bottom section 14 of the eyewire element, whereby the nasal end of the groove or channel 26 of the non-metallic element communicates with the nasal portion of the groove or channel 15 of the bottom section 14 of the eyewire element. Said non-metallic element being thus disposed in assembled relation to the eyewire element, the free end portion of the eyewire bottom section 14, with its coupler piece 17, is upwardly moved into the chamber 23 of the temporal end portion or ear 19, so that said coupler piece 17 is entered in the lower end portion of the passage or bore 22, whereupon the coupling screw 18 is screwed into the screw-threaded bore of the coupling piece 16, to thereby close the eyewire element, whereupon the temporal end portion of the groove or channel 26 of the non-metallic element is aligned in communication with the groove or channel 15 of the eyewire bottom section 14, and in supporting relation to a lens 11 inserted in the thus formed rim structure.

It will be obvious that, when a rim structure is closed in the manner above described, the turning home of a single fastening element, viz. a coupling screw 18, serves not only to firmly and securely hold the non-metallic element in rim structure forming relation to the eyewire element, but additionally firmly and securely locks the insert 28 and its hinge knuckle members 30 in operative assembled relation to the temple end portions or ears 19 of the rim structures, ready for pivotal attachment thereto and support thereby of temple elements 32 by which the frame is completed. Said temple elements are provided, at their inner frame joining ends, with hinge knuckle members 33 adapted to be pivotally connected to the frame hinge knuckle members 30 by pivoting screws 34. It will be apparent that the resultant spectacle frame, including the attached temple elements, provides a strong frame front of attractive appearance having novel and exceedingly simple means for holding its parts in assembled relation and for hinging the temple elements thereto, wherein the number of parts and fastening devices have been reduced to a minimum.

To complete the frame front, nose pad members 35 are soldered to the exterior edges of the nasal portions of the eyewire bottom sections 14 of the respective rim structures.

Referring to Figs. 6 and 7, a somewhat modified construction of coupler piece 16 and insert 28 engaged thereby is shown, wherein insert 28 is tapered from its forward end toward its rearward end, and wherein the diametric passage 29 of said insert is likewise tapered from its upper end toward its bottom end. That portion of the coupler piece 16 which engages in said tapered diametric passage 29 of the insert 28 is provided with a correspondingly tapered section 16'. Due to the tapered formation of these parts, when the same are assembled in the temporal end portion or ear 19 of a non-metallic element of a rim structure, a strongly wedged interlocking of the assembly results, whereby to further assure a firm and secure holding thereof in place.

It will be understood that the spectacle frame construction, according to this invention, permits interchange of the non-metallic or plastic elements of the rim structures and their associated temple elements 32, so that selected colors thereof may be used, whereby to accommodate the appearance of the frame to the taste and cosmetic requirements of individual wearers.

Having now described my invention, I claim:

1. In a spectacle frame having lens embracing rim structures joined by an intermediate nose bridge, each rim structure comprising a discontinuous metallic eyewire formed by a top section and a bottom section extending from the nasal end of said top section, a tubular coupler piece unitary with and dependent from the temporal end of said top section, a second tubular coupler piece unitary with the temporal free end of said bottom section to oppose said first mentioned coupler piece, at least one of said coupler pieces being internally screw-threaded, a non-metallic element formed by a temple supporting ear and an integral arm inwardly extending therefrom along which said top section of the eyewire extends, said ear having a transverse opening extending between its front and rear faces, a metallic insert mounted in said opening and provided at its rearward end with temple hinging knuckle means to project exteriorly from the rear face of said ear, said insert having a perpendicular diametric passage therethrough, said ear also having a perpendicular passage extending between its top and bottom edges in aligned communication with the diametric passage of said insert and in which said coupler pieces are entered respectively through opposite ends thereof so that at least one thereof extends through the diametric passage of said insert, whereby to lock said insert in its mounted relation to said ear, and a coupling screw to secure said coupler pieces together, whereby to hold the non-metallic element in assembled relation to the eyewire element and the rim structure closed in lens supporting condition.

2. In a spectacle frame according to claim 1, wherein the forward end of the insert in each rim structure is provided with an ornamental formation adapted to be exposed at the front face of the ear in which the insert is mounted.

3. In a spectacle frame having lens embracing rim structures joined by an intermediate nose bridge, each rim structure comprising a discontinuous one-piece metallic eyewire formed by a top section and a bottom section extending from the nasal end of said top section, at least said bottom section having an internal groove to embrace lower peripheral portions of a lens, an internally screw-threaded coupler piece unitary with and dependent from the temporal free end of said top section, a second tubular coupler piece unitary with the temporal free end of said bottom section to oppose said first mentioned coupler piece, a non-metallic element formed by a temple supporting ear and an integral arm inwardly extending therefrom along the top of which said top section of the eyewire extends, said non-metallic element having an internal groove to embrace upper peripheral portions of a lens, said ear having a transverse opening extending between its front and rear faces, a metallic insert mounted in said opening and provided at its rearward end with temple hinging knuckle means to project exteriorly from the rear face of said ear, said insert having a perpendicular diametric passage therethrough, said ear also having a perpendicular passage extending between its top and bottom edges in aligned communication with the diametric passage of said insert and in which said first mentioned coupler piece is entered to extend through the diametric passage of said insert, whereby to lock said insert in its mounted relation to said ear, and a coupling screw engaged through said second mentioned coupler piece to screw into said first mentioned coupler piece, whereby to hold the non-metallic element in assembled relation to the eyewire element and the rim structure closed in lens supporting condition.

4. In a spectacle frame according to claim 3, wherein the insert is tapered from its outer end toward its rear end, the diametric passage of said insert being tapered from its top to its bottom end, and said first mentioned coupler piece having a tapered section conforming to the tapered formation of said diametric passage of said insert through which it extends.

5. In a spectacle frame according to claim 3, wherein the forward end of the insert in each rim structure is provided with an ornamental formation adapted to be exposed at the front face of the ear in which the insert is mounted.

References Cited in the file of this patent

UNITED STATES PATENTS

| | | |
|---|---|---|
| 1,109,285 | Haase | Sept. 1, 1914 |
| 2,326,971 | Rey | Aug. 17, 1943 |
| 2,329,100 | Chappell | Sept. 7, 1943 |
| 2,552,121 | Splaine | May 8, 1951 |
| 2,554,386 | Rohrbach | May 22, 1951 |
| 2,599,074 | Stegeman | June 3, 1952 |
| 2,694,341 | Hansen | Nov. 16, 1954 |

FOREIGN PATENTS

| | | |
|---|---|---|
| 763,805 | France | Feb. 19, 1934 |
| 819,833 | France | July 19, 1937 |
| 870,078 | France | Dec. 5, 1941 |